United States Patent
Suzuki

[19]

[11] Patent Number: 6,104,476
[45] Date of Patent: Aug. 15, 2000

[54] DISTANCE MEASURING APPARATUS AND COMPUTER READABLE STORAGE MEDIUM

[75] Inventor: Satoshi Suzuki, Tokyo, Japan

[73] Assignee: Canon Kabushiki Kaisha, Tokyo, Japan

[21] Appl. No.: 09/304,308

[22] Filed: May 3, 1999

[30] Foreign Application Priority Data

May 8, 1998 [JP] Japan .................................. 10-125737

[51] Int. Cl.[7] .............................. G01C 3/00; G03B 3/00; G03B 13/00
[52] U.S. Cl. .................... 356/3.01; 250/201.6; 356/3.07; 356/3.08; 396/96; 396/106
[58] Field of Search ................................... 356/3.01, 3.03, 356/3.07, 3.08; 396/106, 96; 250/201.6, 552

[56] References Cited

U.S. PATENT DOCUMENTS

| | | | |
|---|---|---|---|
| 5,848,305 | 12/1998 | Takaski ..................................... | 396/96 |
| 5,850,282 | 12/1998 | Egawa ..................................... | 356/3.08 |
| 5,870,178 | 2/1999 | Egawa et al. ............................ | 356/3.03 |
| 5,963,308 | 10/1999 | Takasaki et al. ........................ | 356/3.01 |

*Primary Examiner*—Stephen C. Buczinski
*Attorney, Agent, or Firm*—Morgan & Finnegan, L.L.P.

[57] ABSTRACT

A distance measuring apparatus having skimming function which suppresses electric consumption when a charge storing period is shortened by an electronic shutter function. For this purpose, at an initial setting, an integration period is set to $T_1$ by ICG pulse and ST pulse, and ON and OFF periods of light emitting diode IRED are set to the same periods. In the ON period, photoelectric conversion is performed on reflected light from a measurement object, and the obtained charge is stored. In the OFF period, a predetermined amount of charge is eliminated by an ICG pulse a, then after the period $T_1$, the stored charge is transferred to a storage unit on the next stage by an ST pulse b. If an output voltage after several storing operations is higher than a skim judgment voltage, the integration period $T_1$ is reduced in half, and the ON period of the IRED is shortened.

8 Claims, 11 Drawing Sheets

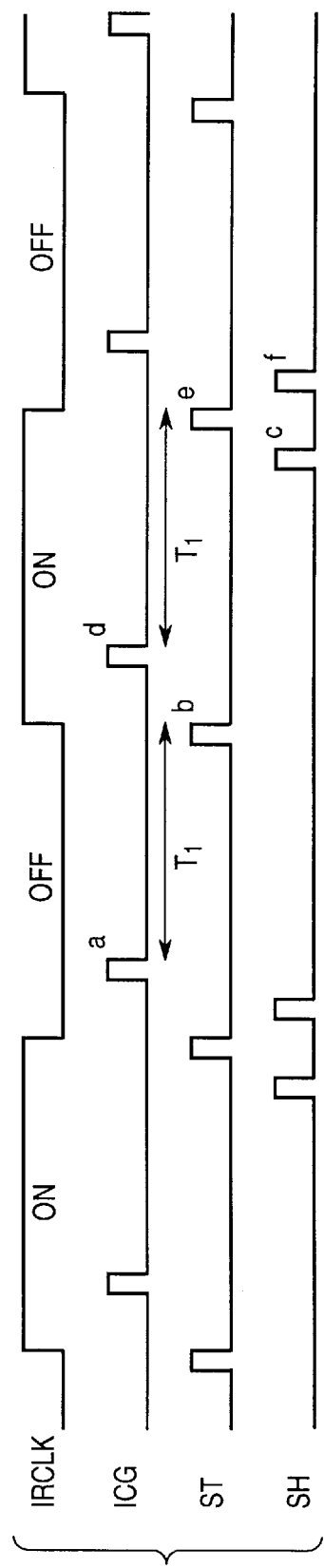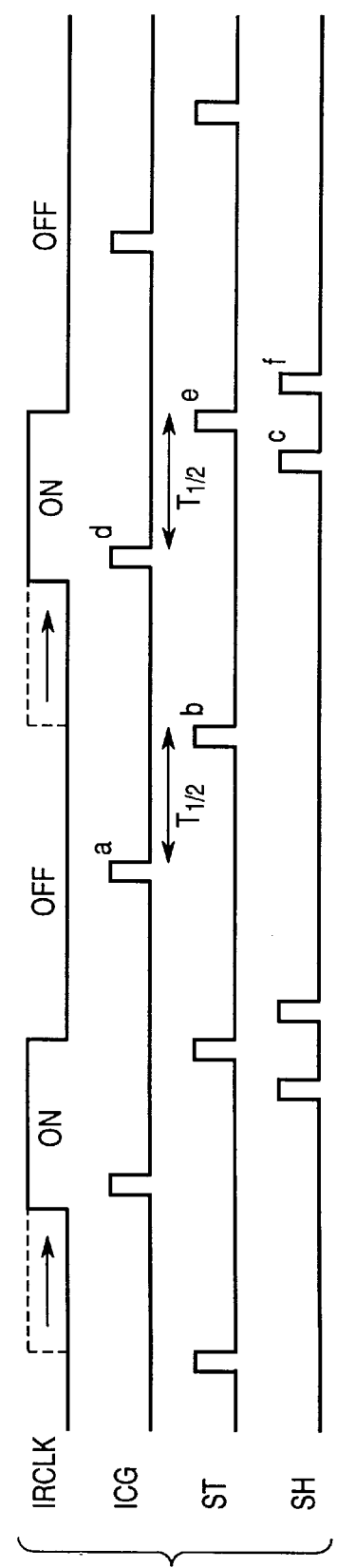

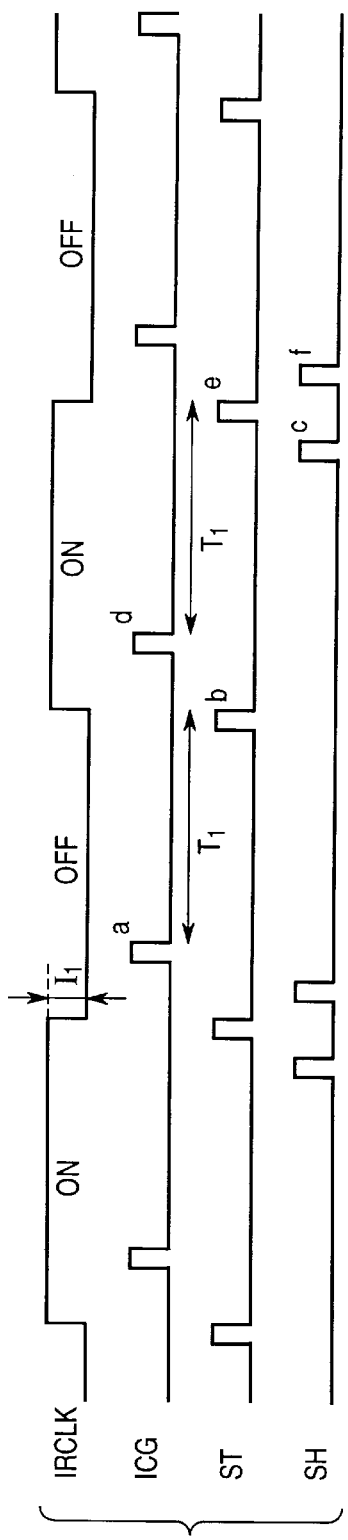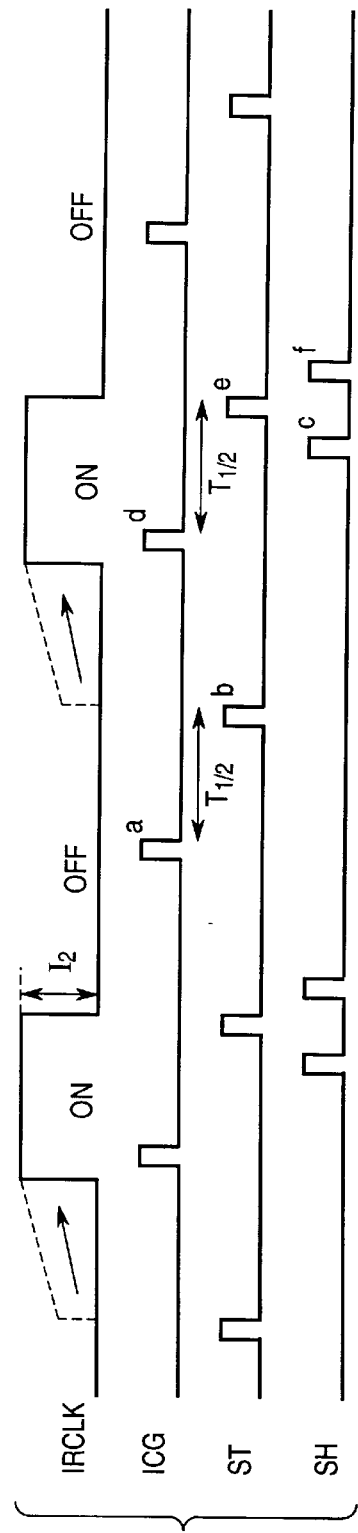

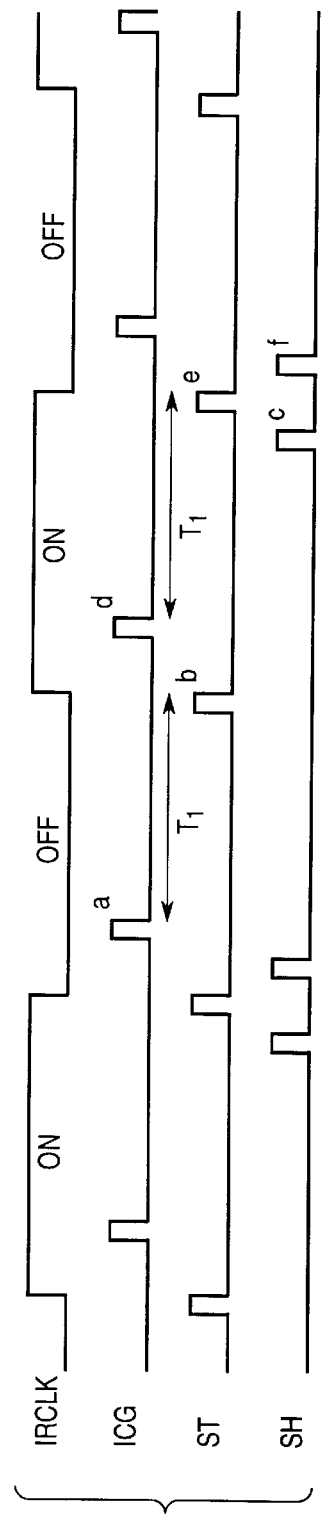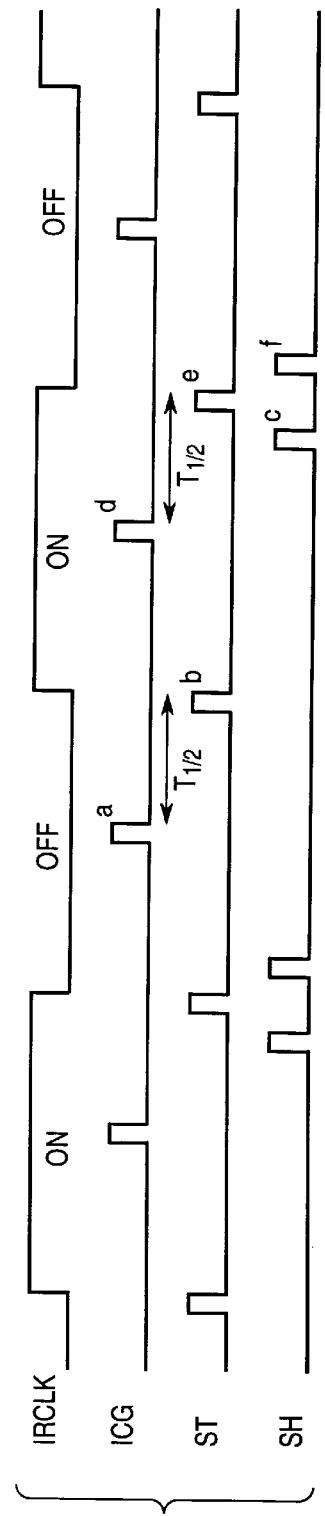

DISTANCE MEASURING APPARATUS AND COMPUTER READABLE STORAGE MEDIUM

BACKGROUND OF THE INVENTION

The present invention relates to a distance measuring apparatus and a computer readable storage medium for measuring a distance from an object of measurement, preferably applicable to an AF mechanism of a camera.

Conventionally, a distance measuring apparatus which performs triangulation as distance measurement by projecting spot light on a measurement object and receiving reflected light from the object, as shown in FIG. 6, is well known. That is, an infrared light emission diode (IRED) 81 projects spot light via a projection lens 82 on a measurement object 83, and reflected light from the object is received by a position sensitive device (PSD) 85 via a photoreception lens 84. The PSD 85 outputs signals A and B corresponding to a photoreception position, from both terminals. The photoreception position at the PSD 85 is detected by respectively measuring the signals A and B, and the distance from the measurement object 83 is obtained.

However, the conventional distance measuring apparatus in FIG. 6 has the following problems. That is, in consideration of S/N ratio, noise occurred from the resistance of the amplifier of a signal processor (both not shown) and the PSD is mixed with each synchronous integration in a faint signal, accordingly, to increase a signal component, a distance measuring block constituted with the projection lens 82, the photoreception lens 84 and the like must be enlarged and/or the power of the IRED 81 must be increased, and the distance measuring apparatus cannot be downsized without difficulty.

Further, to widen a distance measuring range, the PSD 85 must be lengthened. However, if the PSD 85 is long, a change rate of distance decreases in the obtained signals A and B, thus the precision in position detection is lowered.

Accordingly, a distance measuring apparatus to perform triangulation as distance measurement by projecting a spot pulse to a measurement object and receiving reflected light from the object, Japanese Published Examined Patent Application No. Hei 5-22843 proposes a distance measuring apparatus which circulates and integrates stored charge in a CCD, at least partially ring shaped, and performs skimming operation to eliminate a predetermined amount of charge of extraneous light component other than the spot light component.

Further, Japanese Published Unexamined Patent Application No. Hei 9-42955 proposes a distance measuring apparatus having the above construction, and further comprising an electronic shutter function (ICG) to control a signal charge amount from each sensor pixel, so as to prevent saturation of output potential.

The distance measuring apparatus proposed by the above-described Japanese Published Unexamined Patent Application No. Hei 9-42955 will be described with reference to FIGS. 7 and 8.

In FIG. 7, a sensor array 41 comprises N sensor blocks $S_1$, $S_2$, $S_3$, . . . , $S_N$ as shown in FIG. 8. Signal charge photoelectric-converted by the respective sensor blocks $S_1$, $S_2$, $S_3$, . . . , $S_N$ are integrated by an integration unit 42.

A clear unit 43 driven by an ICG signal is a so-called electronic shutter comprising a gate circuit. The clear unit 43 has a function to prevent overflow at the integration unit 42 by eliminating a predetermined amount of charge from the integration unit 42, and a function to initialize the integration unit 42 by eliminating all the charge from the integration unit 42.

A storage unit 44 driven by a signal ST is provided in parallel to the sensor array 41. The storage unit 44 temporarily holds charge. A shift unit 45 driven by a signal SH transfers the charge stored in the storage unit 44 to a 2N-stage linear CCD 46 as a charge transfer unit. The linear CCD 46 is connected to a 2N-stage ring CCD 47 as a charge transfer unit. In these linear CCD 46 and the ring CCD 47, each stage comprises a 2-phase CCD driven by a 2-phase clock. Note that each stage may comprise a 3-phase CCD, 4-phase CCD or the like.

A skimming unit 48 provided in the ring CCD 47 eliminates a predetermined amount of charge from a corresponding CCD on the ring CCD 47. A voltage buffer circuit 49 generates a voltage corresponding to the amount of charge stored in a corresponding CCD on the ring CCD 47. A skim judgment unit 50 compares an output voltage from the voltage buffer circuit 49 with a skim judgment voltage, and outputs a judgment signal.

A controller 51 generates shift timing signals (ST and SH) and transfer clock signals for the linear CCD 46 and the ring CCD 47, and outputs the signals. Further, the controller 51 inputs the skim judgment signal from the skim judgment unit 50 and outputs a control signal for the skimming unit 48 in correspondence with the input skim judgment signal, further, outputs a control signal for a reset pulse generator 52 which generates an ICG pulse.

The distance measuring apparatus having the above construction performs skim judgment using the voltage output from the voltage buffer circuit 49 corresponding to the amount of stored charge in the ring CCD 47, prior to full-scale signal storing operation in the ring CCD 47, and if the level of its potential is at a level requiring skimming operation, the controller 51 changes reset timing at the clear unit 43 as the ICG gate, to control integration period of the integration unit 42 not to cause overflow.

FIG. 9 shows the relation between the skim judgment potential and the skimming amount and the influence of ICG control, in the apparatus in FIG. 7. In FIG. 9, a reference potential is at a potential level upon reset of the ring CCD (i.e., when no charge is stored in the ring CCD). In the CCD, as charge is stored, the potential is lowered, accordingly, the skim judgment potential is set to a lower level than the reference potential. The skimming amount skimmed by the skimming unit 48 includes a predetermined difference due to variation of potential of the skimming unit 48 itself, further, the skim judgment potential includes a difference. To prevent disappearance of signal from the ring CCD 47 upon skimming operation, the potential level of the skimming amount is set to a lower level than the skim judgment potential.

In the apparatus in FIG. 7, the ring CCD 47 is reset, and storing operation is made twice, then the integration unit 42 performs ICG control from the result of skim judgment on the output voltage from the ring CCD 47. Note that in the apparatus in FIG. 7, the output voltage from the ring CCD 47 after two storing operations after the reset of the ring CCD 47 is used, however, the output voltage after three or more storing operations may be used in accordance with the relation between the skimming amount and the skim judgment potential.

FIG. 9A shows a case where the luminance is comparatively high. In this case, a voltage drop amount $V_{Q1}$ due to the first storing operation in the ring CCD 47 is greater than the amount of one skimming operation. In this prior art, skim judgment is not performed upon first storing operation after reset of the ring CCD 47, and the second storing operation is performed. Then, the output potential of the buffer circuit 49 is lower than the skim judgment potential. Then, the skimming unit 48 performs skimming so as to set the potential level of the ring CCD 47 to $V_1$. Further, from the result of skim judgment, reset timing by the ICG pulse is changed. In this case, the integration period of the integration unit 42 is reduced in half. Accordingly, the amount of stored charge is $V_{Q1}/2$ From the next storing operation.

In this manner, in the apparatus in FIG. 7, in a case where the ring CCD 47 is reset and charge storing operation is performed twice, if the potential of the ring CCD 47 after the second charge storing operation is equal to or lower than the skim judgment potential, the timing of reset pulse is controlled so as to reduce the integration period of the integration unit 42 in half. By this arrangement, the amount of stored charge after the next charge storing operation becomes $V_{Q1}/2$. Further, as the skimming operation is performed from the subsequent charge storing operation, the output voltage from the voltage buffer circuit 49 is maintained at a level not to cause saturation.

FIG. 9B shows a case where the luminance is at about an intermediate level. In this case, the voltage drop amount $V_{Q2}$ due to the first storing operation in the ring CCD 47 is somewhat less than the amount of one skimming operation. By the second storing operation, the output voltage from the voltage buffer circuit 49 is lower than the skim judgment potential. Then, the skimming unit 48 performs skimming to set the potential level of the ring CCD 47 to $V_2$. Further, from the result of skim judgment, the reset timing of the ICG pulse is changed to reduce the integration period of the integration unit 42 in half. Accordingly, the amount of stored charge in the ring CCD 47 is $V_{Q2}/2$ from the next storing operation.

In this case, the ring CCD 47 is reset and charge storing operation is performed twice, then the potential of the CCD 47 in the second storing operation is compared with the skim judgment potential, and the timing of the reset pulse is controlled so as to reduce the integration period of the integration unit 42 in half. Accordingly, the amount of stored charge in one storing operation reduces to $V_{Q2}/2$. Further, as the skimming operation is performed in the subsequent operations, the output voltage from the voltage buffer circuit 49 is maintained at a level not to cause saturation.

FIG. 9C shows a case where the luminance is comparatively low. In this case, the voltage drop amount $V_{Q2}$ due to the first storing operation in the ring CCD 47 is considerably less than the amount of one skimming operation. Then, after the second storing operation, the output voltage from the voltage buffer circuit 49 is still higher than the skim judgment potential, and by the third storing operation, the output voltage from the voltage buffer circuit 49 becomes lower than the skim judgment potential. Then, after the third storing operation, the skimming unit 48 performs skimming to set the potential level of the ring CCD 47 to $V_3$. At this time, the reset timing of the ICG pulse is not changed. Accordingly, the amount of stored charge in the ring CCD 47 from the subsequent storing operation remains $V_{Q3}$.

In this case, the ring CCD 47 is reset and the charge storing operation is performed twice, then the potential of the ring CCD 47 is compared with the skim judgment potential. As the timing of the reset pulse is controlled so as not to change the integration period of the integration unit 42, the amount of stored charge in one storing operation thereafter remains $V_{Q3}$. However, as the luminance is comparatively low and the amount of stored charge $V_{Q3}$ by one storing operation is considerably less than the amount of one skimming, and the skimming operation is performed in the subsequent storing operations, the output voltage from the voltage buffer circuit 49 is maintained at a level not to cause saturation.

Next, the operation timing of the distance measuring apparatus in FIG. 7 will be described with reference to FIGS. 10A and 10B.

FIG. 10A is a timing chart in a case where the integration period of the integration unit 42 is the maximum. A signal IRCLK indicates ON and OFF states of the infrared light emission diode (IRED). When the signal IRCLK is at a high level, the IRED is in the ON state. The ICG pulse is a signal to control the reset timing of the clear unit 43 (hereinafter referred to as an "ICG gate 43"). When the ICG pulse is at a high level, the charge is eliminated from the integration unit 42. An ST pulse is a shift pulse to the storage unit 44. When the ST pulse is at a high level, the charge is shifted from the integration unit 42 to the storage unit 44. An SH pulse is a shift pulse to the linear CCD 46. When the SH pulse is at a high level, the charge is shifted from the storage unit 44 through the shift unit 45 to the linear CCD 46.

First, immediately after the signal IRCLK became OFF, the ICG gate 43 is reset by the ICG pulse a. Then, signal charge (extraneous light) corresponding to the OFF period of the IRED is shifted from the integration unit 42 to the storage unit 44, by the ST pulse b immediately before the signal IRCLK becomes ON after a period $T_1$, further, shifted from the storage unit 44 to the linear CCD 46 by the SH pulse c immediately before the signal IRCLK becomes OFF. Next, immediately after the signal IRCLK became ON, the ICG gate 43 is reset by the ICG pulse d. Then, signal charge (extraneous light+signal component) corresponding to the ON period of the IRED is shifted from the integration unit 42 to the storage unit 44, by the ST pulse e immediately before the signal IRCLK becomes OFF after a period $T_1$, further, shifted from the storage unit 44 to the linear CCD 46 by the SH pulse f immediately after the signal IRCLK has become OFF.

FIG. 10B is a timing chart in a case where the integration period in the integration unit 42 is the half of the period in FIG. 10A. In this case, the timings of the ST pulse and SH pulse other than the ICG reset pulse are the same as those in FIG. 10A. The ICG reset pulse is at the high level at approximately mid-term of the ON and OFF periods of the signal IRCLK, so as to reduce the integration period of the integration unit 42 to the half of the integration period in FIG. 10A.

First, immediately after the half of the OFF period of the signal IRCLK elapsed, the ICG gate 43 is reset by the ICG pulse a. Then, after the period $T_{1/2}$, signal charge (extraneous light component) corresponding to the OFF period of the IRED is shifted from the integration unit 42 to the storage unit 44 by the ST pulse b immediately before the signal IRCLK becomes ON, further, shifted from the storage unit 44 to the linear CCD 46 by the SH pulse c immediately before the signal IRCLK becomes OFF.

Next, immediately after the half of the ON period of the signal IRCLK elapsed, the ICG gate 43 is reset by the ICG pulse d. Then, after the period $T_{1/2}$, signal charge (extraneous light+signal component) corresponding to the ON period of the IRED is shifted from the integration unit 42 to the storage unit 44, by the ST pulse e immediately before the signal IRCLK becomes OFF, further, shifted from the storage unit 44 to the linear CCD 46 by the SH pulse f immediately after the signal IRCLK became OFF.

In this manner, in this example, the integration period of the integration unit 42 is controlled and the amount of potential change of the ring CCD 47 by one charge storing operation is controlled, by controlling the timing of the ICG pulse.

Next, the operation of the distance measuring apparatus in FIG. 7 will be described in accordance with a flowchart of FIG. 11.

First, when a start signal START is applied to the controller 51 (step S1101), the controller 51 controls the reset pulse generator 52 that generates the reset pulse to the ICG gate 43, so as to generate the ICG pulse, the ST pulse and the SH pulse at the timings in FIG. 10A, and set the integration period of the integration unit 42 to $T_1$ (step S1102).

Next, after reset of the ring CCD 47, the first ring transfer is performed (step S1103), and the second ring transfer is performed (step S1104). Then, it is determined whether or not the output voltage from the voltage buffer circuit 49 upon completion of the second ring transfer is higher than the skim judgment voltage (whether or not the output potential is lower than the skim judgment potential) (step S1105). If the output voltage is higher than the skim judgment voltage, the controller 51 controls the reset pulse generator 52, to generate the ICG pulse, the ST pulse and the SH pulse at the timings in FIG. 10B, to set the integration period of the integration unit 42 to $T_{1/2}$ (step S1106), and continues the storing operation in the ring CCD 47 (step S1107).

If the output voltage is lower than the skim judgment voltage, the timings of the ICG pulse, the ST pulse and the SH pulse are not changed, and the storing operation in the ring CCD 47 is continued (step S1107).

As described above, in the distance measuring apparatus in FIG. 7, the timing of the ICG reset pulse is controlled to set the integration period of the integration unit 42 in half, based on the potential of the ring CCD 47 upon second charge storing operation. Accordingly, even if the luminance is comparatively high and the amount of potential change of the ring CCD 47 by one charge storing operation is greater than the skimming amount, the potential of the ring CCD 47 upon the second charge storing operation is reliably lower than the skim judgment potential. As the amount of potential change of the ring CCD 47 becomes the half from the subsequent charge storing operation, the output voltage almost does not reach a saturation level even if the charge storing operation is continuously performed. Further, the size of the apparatus in FIG. 7, which can be smaller than that of the apparatus in FIG. 6, performs distance measurement with high precision.

However, the distance measuring apparatus in FIG. 7 proposed by the above-described Japanese Published Unexamined Patent Application No. Hei 9-42955 has the following problems.

The storing period is shortened by the ICG control, however, the ON and OFF periods of the IRED are the same. Accordingly, other than the charge storing period, a period to turn the IRED ON occurs, which wastes electric power.

Further, to shorten the storing period is to reduce the amount of signal charge corresponding to an extraneous light component when the luminance is high, and to reduce the amount of signal charge, corresponding to a reflected light component from the object of distance measurement in the IRED light, which can be stored in one storing operation in the ring CCD. Thus, it takes more time to store signal charge necessary for distance measurement calculation. That is, the distance measurement period increases.

SUMMARY OF THE INVENTION

The present invention has been made in consideration of the above situation, and has its object to suppress wasteful electric consumption upon reduction of storing period by ICG control, and to prevent reduction of the amount of stored signal charge corresponding to reflected light from an object of distance measurement, used in distance measurement calculation, regardless of the reduction of the storing period by the ICG control.

To solve the above-described problems and attain the foregoing object, the present invention provides a distance measuring apparatus which projects spot light on a measurement object, receives reflected light from the object, and performs triangulation as distance measurement, comprising: light projection means for projecting pulse light on the measurement object; a sensor array having an array of a plurality of sensors to receive the reflected light from the measurement object and perform photoelectric conversion on the received reflected light; integration means for integrating charge outputted from the respective sensors of the sensor array; gate means for eliminating the charge from the integration means; reset pulse generation means for supplying a reset pulse to the gate means; charge transfer means, having a ring portion with at least a ring-shaped part to sequentially circulate and store the charge, for transferring the charge integrated by the integration means; skimming means for eliminating a predetermined amount of charge from the charge transferred by the ring portion; control means for operating the skimming means when a potential of the ring portion is equal to or lower than a predetermined judgment potential, and controlling timing of the reset pulse generated by the reset pulse generation means so as to shorten a charge storing period of the integration means when the potential of the ring portion after a plurality of charge storing operations is equal to or lower than the judgment potential; and change means for changing an ON period of the light projection means in correspondence with the charge storing period controlled by the control means.

Further, the foregoing object is attained by providing a computer readable storage medium containing a program for performing: a light projection procedure for projecting pulse light on a measurement object; a photoreception procedure for receiving reflected light from the measurement object by a sensor array having an array of a plurality of photoelectric conversion sensors; an integration procedure for integrating charge outputted from the respective sensors of the sensor array; a gate procedure for eliminating the charge from the integrated charge; a reset procedure for resetting the gate procedure with a reset pulse; a charge transfer procedure for transferring the integrated charge, using charge transfer means having a ring portion with at least a ring-shaped part to sequentially circulate and store the charge; a skimming procedure for eliminating a predetermined amount of charge from the charge transferred by the ring portion; a control procedure for performing the skimming procedure when a potential of the ring portion is equal to or lower than a predetermined judgment potential, and controlling timing of the reset pulse so as to shorten a charge storing period in the integration procedure when the potential of the ring portion after a plurality of charge storing operations is equal to or lower than the judgment potential; and a change procedure for changing an ON period of light projection means used in the projection procedure, in correspondence with the controlled charge storing period.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are timing charts showing the operation timing of a distance measuring apparatus according to a first embodiment of the present invention;

FIGS. 4A and 4B are timing charts showing the operation timing of the distance measuring apparatus according to the second embodiment;

FIGS. 10A and 10B are timing charts showing the operation timing of the conventional distance measuring apparatus in FIG. 7.

DETAILED DESCRIPTION OF THE PREFERRED EMBODIMENTS

Preferred embodiments of the present invention will now be described in detail in accordance with the accompanying drawings.

First, the basic construction of a distance measuring apparatus according to a first embodiment will be described with reference to FIG. 2.

Figure 2:
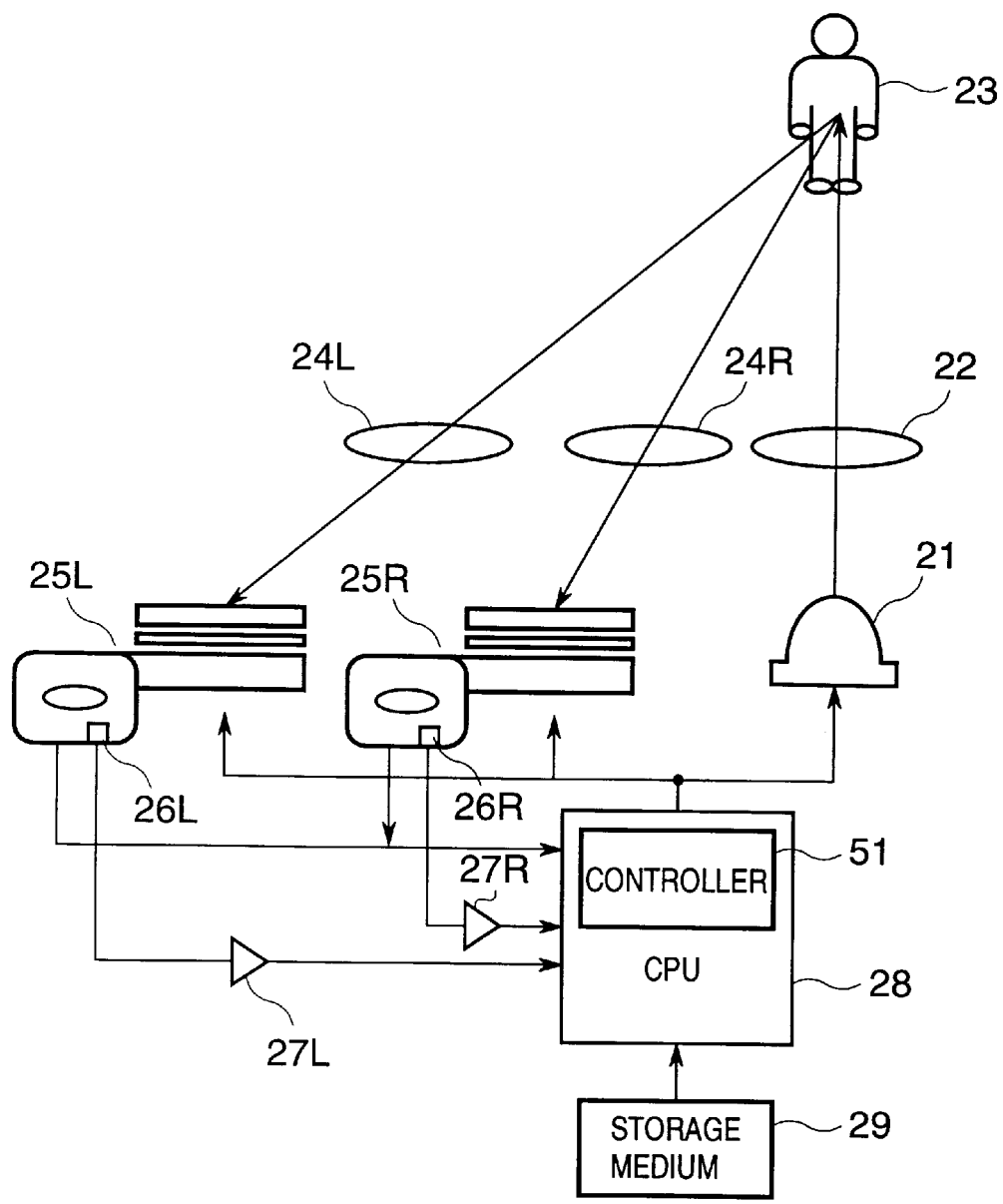
FIG. 2 is a schematic diagram showing the distance measuring apparatus according to the first and second embodiments of the present invention.

In FIG. 2, the controller 51 outputs the transfer clock signal IRCLK to turn an IRED 21 on. At this time, light projected from the IRED 21 impinges on a distance measurement object 23 through a projection lens 22, then light reflected by the distance measurement object 23 passes through photoreception lenses 24R and 24L, and forms received light images on photoreception units 25R and 25L. That is, when the IRED 21 is turned ON, received light images appear on the photoreception units 25R and 25L, and the signals and extraneous light are converted into electric charge by photoelectric conversion devices. Further, when the IRED 21 is turned OFF, only extraneous light impinges on the photoreception units 25R and 25L, and the extraneous light is converted into electric charge by the photoelectric conversion devices. The construction of the photoreception units 25R and 25L is the same as that in the conventional apparatus described with reference to FIGS. 7 and 8.

Figure 7:
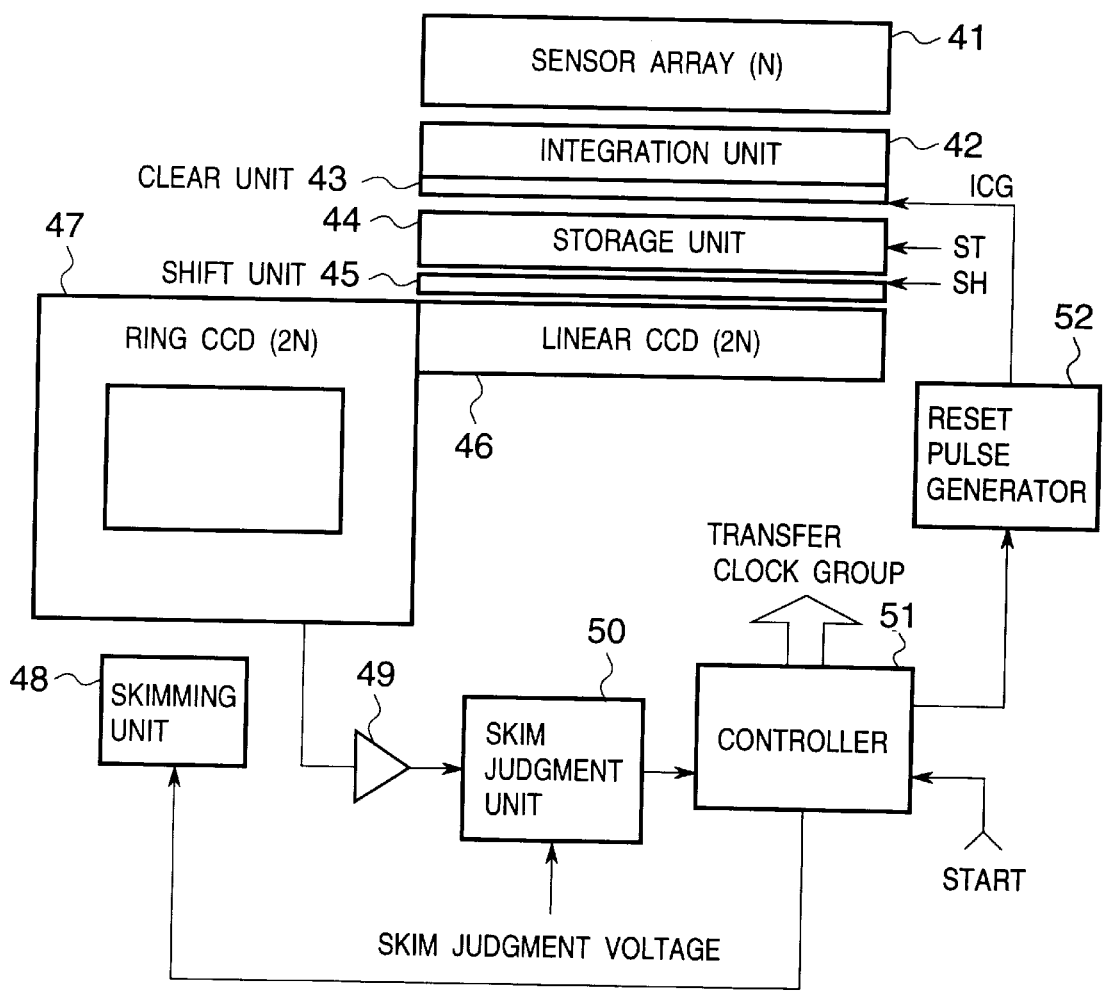
FIG. 7 is a block diagram schematically showing the construction of the charge transfer portion of the conventional distance measuring apparatus.
Figure 8:
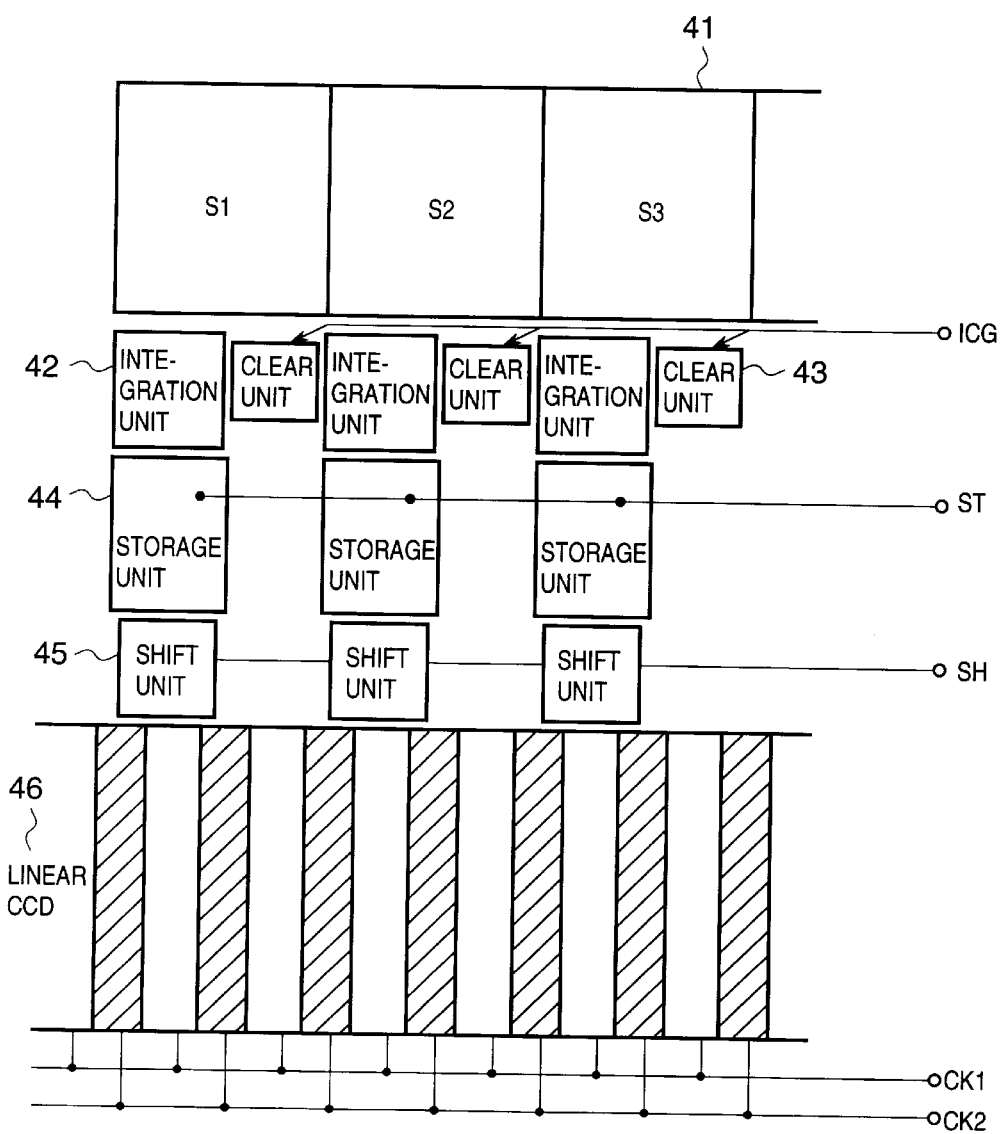
FIG. 8 is a block diagram schematically showing the construction of the significant parts of the conventional distance measuring apparatus in FIG. 7.
Figure 9A:
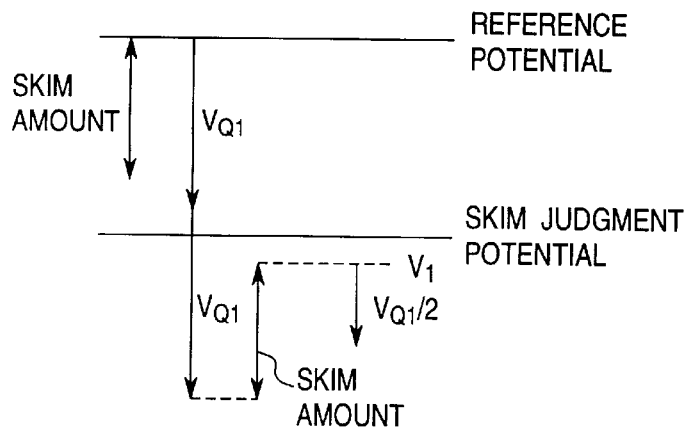
FIGS. 9A to 9C are explanatory views showing the operation principle of the conventional distance measuring apparatus in FIG. 7.
Figure 9B:
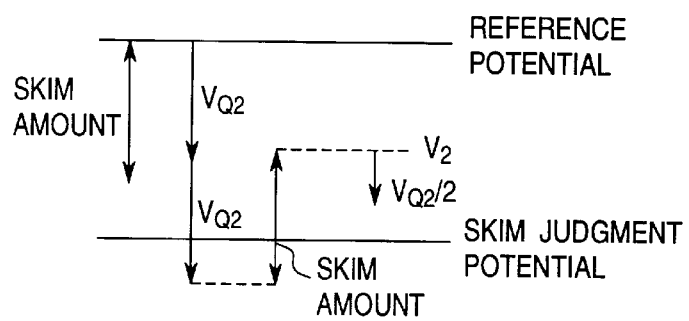
Figure 9C:
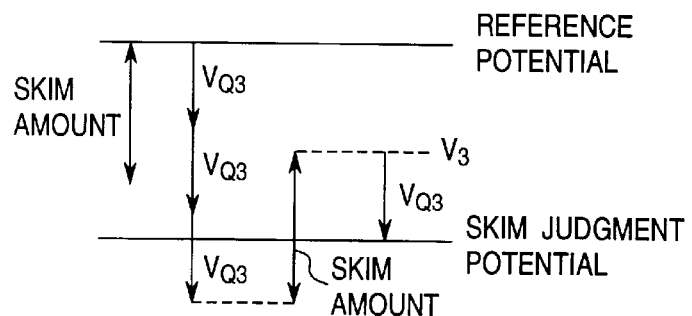
Figure 11:
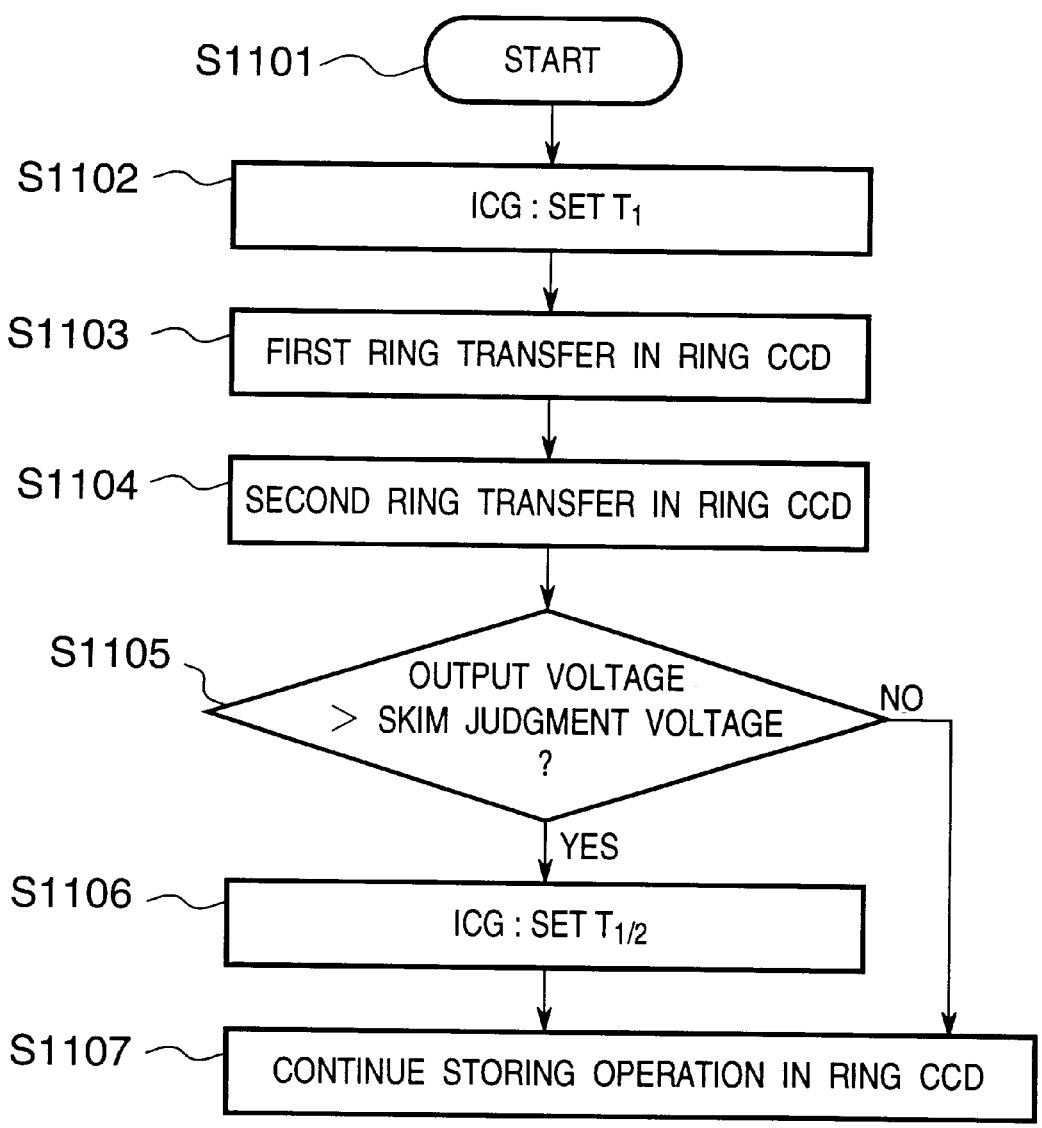
FIG. 11 is a flowchart showing the operation of the conventional distance measuring apparatus in FIG. 7.

If it is determined by a comparator (not shown) that the amount of charge stored in the ring CCD 47, as described in FIG. 7, has reached a predetermined level sufficient to perform distance measurement calculation, the stored charge is transferred from output amplifier floating gates 26R and 26L via output amplifiers 27R and 27L to a CPU 28. The CPU 28 calculates the difference between the amount of charge when the IRED 21 is ON and that when the IRED 21 is OFF, to obtain the amount of charge by the reflected light from the light projected by the IRED 21, impinged on the respective sensors of the photoreception units 25R and 25L. Correlation calculation is performed based on the obtained image data, and the relative positional relation between the two received light images is obtained. Then the distance to the distance measurement object 23 can be calculated by utilizing the principle of triangulation from the obtained relative positional relation.

Figure 5:
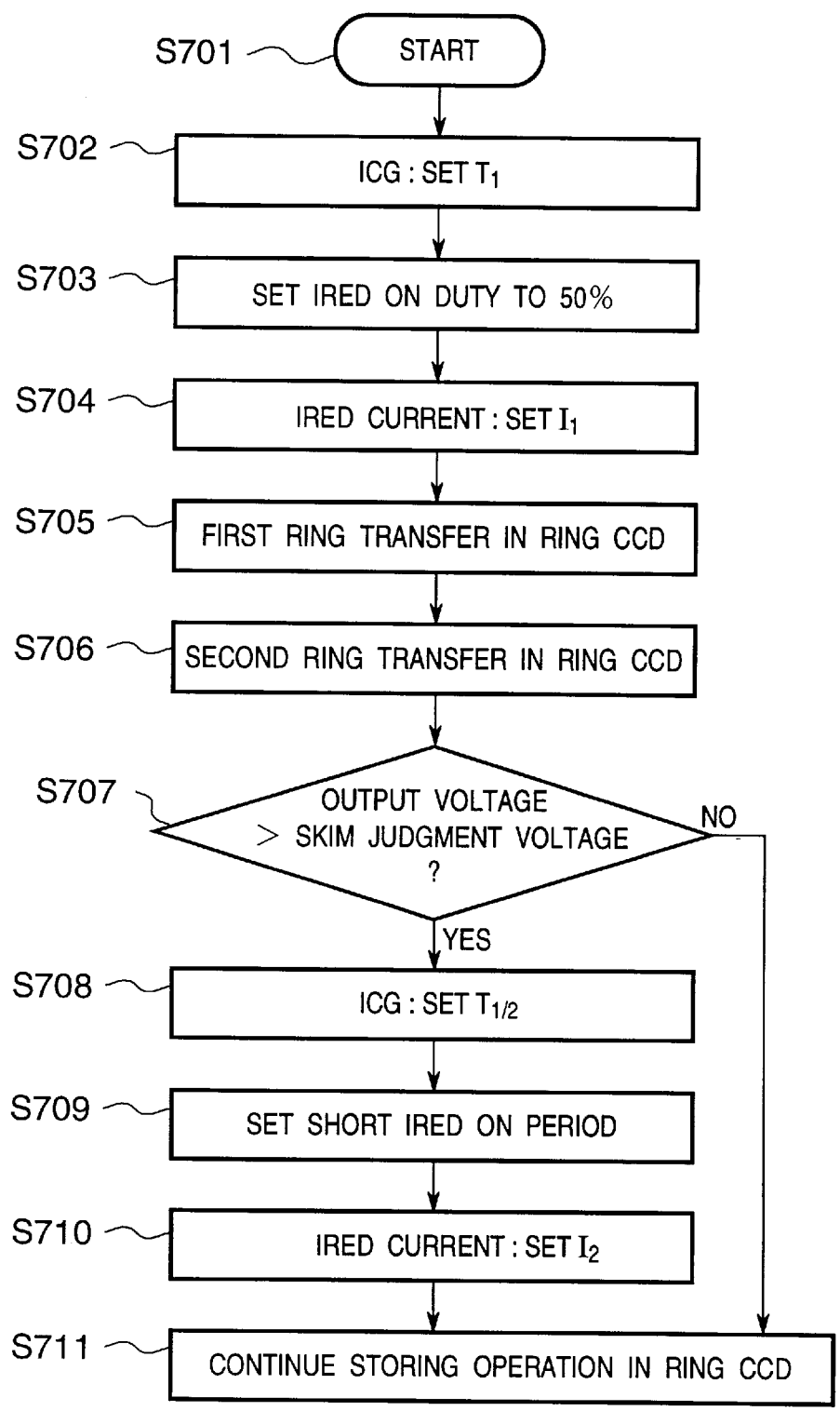
FIG. 5 is a flowchart showing the operation of the second embodiment.
Figure 6:
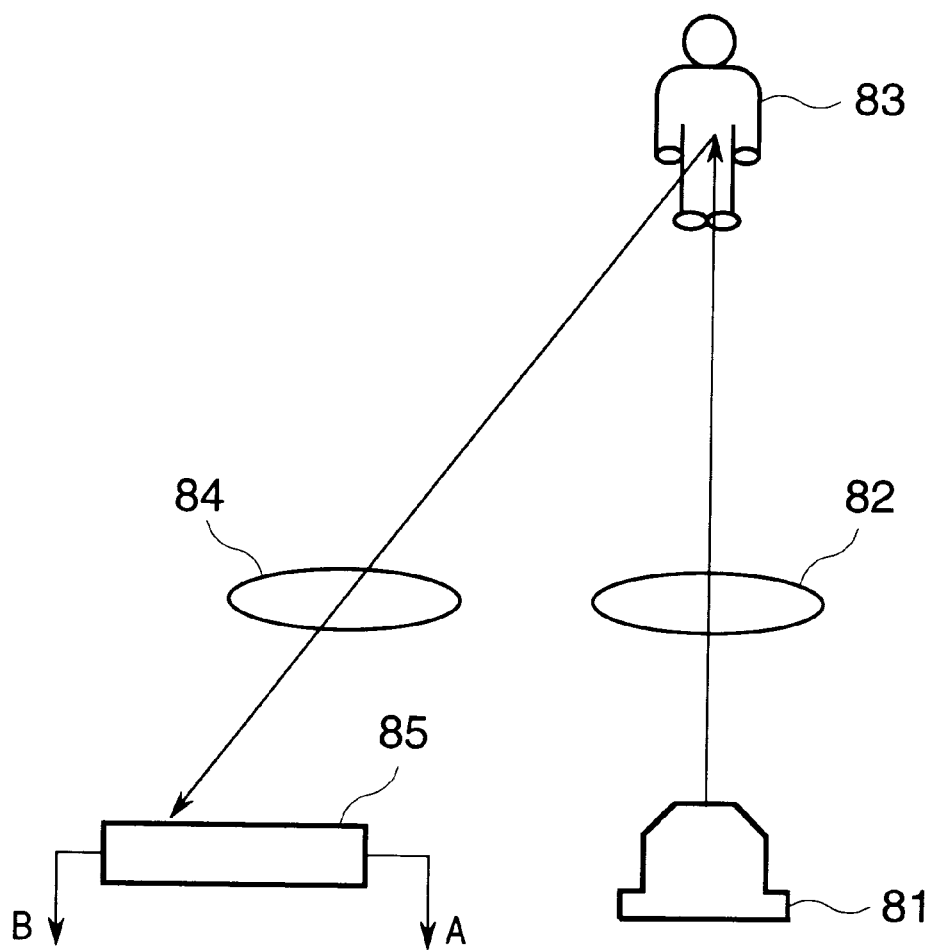
FIG. 6 is a schematic diagram explaining the principle of the conventional distance measuring apparatus.

Note that a storage medium 29 for implementing the present invention contains a program executed by the CPU 28, in accordance with a processing procedure as shown in the flowchart of FIG. 5. The storage medium may comprise a semiconductor memory, an optical disk, a magneto-optical disk, a magnetic medium or the like.

Next, the operation of the distance measuring apparatus according to the first embodiment will be described with respect to FIGS. 1A and 1B. Note that in the following description, the signals IRCLK, ICG pulse, ST pulse and SH pulse have the same functions as those explained in FIG. 10.

FIG. 1A is a timing chart in a case where the integration period of the integration unit 42 is the maximum. In this case, the timings of the signals IRCLK, ICG pulse, ST pulse and SH pulse are the same as those in FIG. 10A.

FIG. 1B is a timing chart in a case where the integration period of the integration unit 42 is the half of the period in FIG. 1A. In this case, the timings of the ST pulse and SH pulse other than the ICG reset pulse and the signal IRCLK are the same as those in FIG. 1A. Further, the ICG reset pulse operates at the same timing of that in FIG. 10B, so as to reduce the integration period of the integration unit 42 in half. Further, the signal IRCLK is at the high level for a shorter period than that in FIG. 1A within the range where the IRED is ON during the integration period set by the ICG reset pulse.

First, when about a period $T_{1/2}$ has elapsed since the signal IRCLK became OFF, the ICG gate 43 is reset by the ICG pulse a. Then, after the period $T_{1/2}$, signal charge (extraneous light component) corresponding to the OFF period of the IRED is shifted from the integration unit 42 to the storage unit 44 by the ST pulse b, further, shifted from the storage unit 44 to the linear CCD 46 by the SH pulse c immediately before the signal IRCLK becomes OFF.

Next, when about the period $T_{1/2}$ has elapsed since the ST pulse b rose, the signal IRCLK is turned ON, and immediately, the ICG gate 43 is reset by the ICG pulse d. Then, after the period $T_{1/2}$ signal charge (extraneous light+ signal component) corresponding to the ON period of the IRED is shifted from the integration unit 42 to the storage unit 44 by the ST pulse e immediately before the signal IRCLK becomes OFF, further, shifted from the storage unit 44 to the linear CCD 46 by the SH pulse f immediately after the signal IRCLK became OFF.

In this manner, in the first embodiment, the integration period of the integration unit 42 is controlled and the amount of potential change of the ring CCD 47 by one charge storing operation is controlled, by controlling the timing of the ICG pulse. Further, the ON period of the IRED is controlled by controlling the high-level period of the signal IRCLK in accordance with the integration period controlled by the ICG pulse, i.e., the amount of potential change for the signal component can be controlled.

Figure 3:
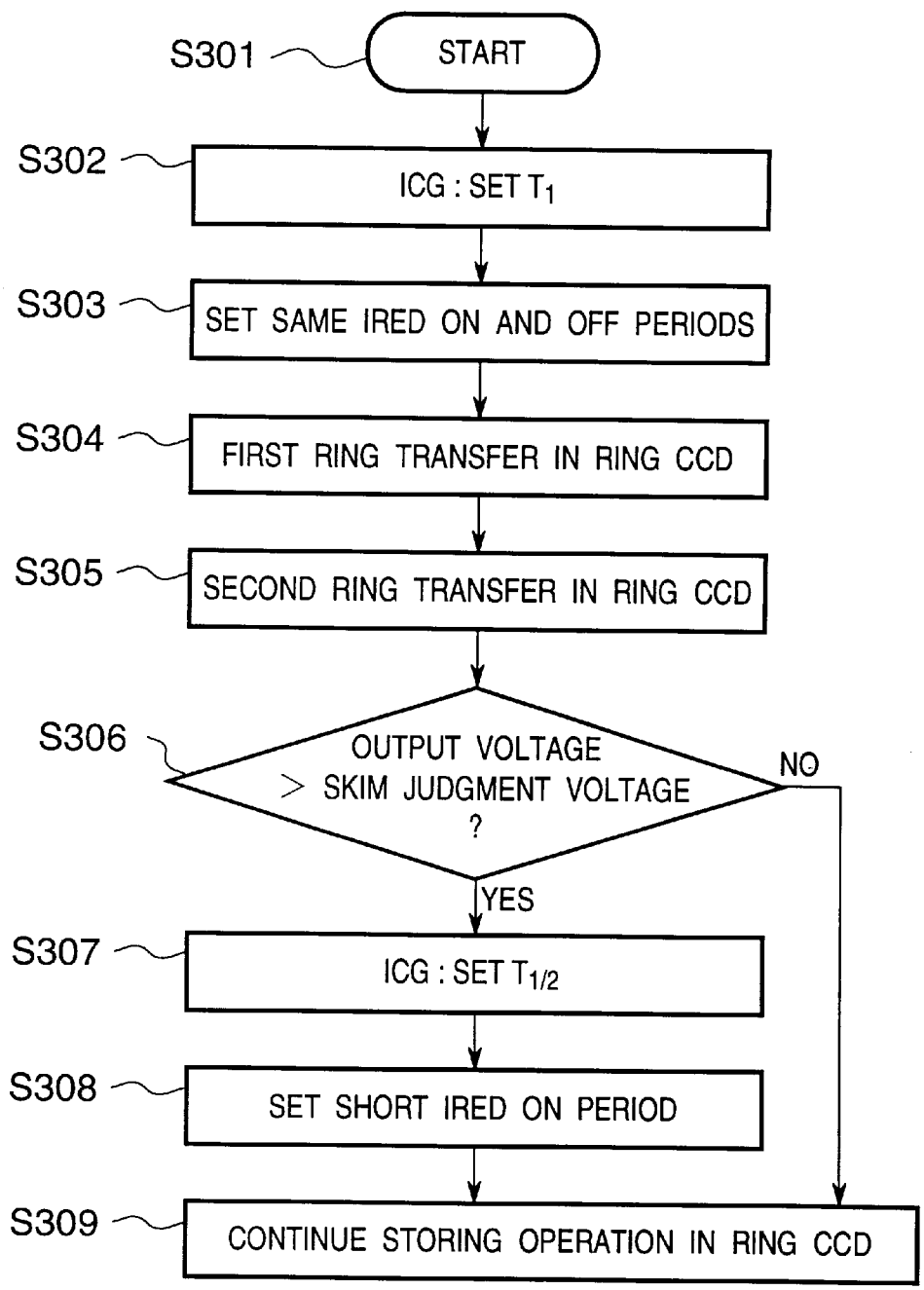
FIG. 3 is a flowchart showing the operation of the first embodiment.

Next, the operation of the distance measuring apparatus according to the first embodiment will be described with reference to the flowchart of FIG. 3.

First, when the start signal START is applied to the controller 51 (step S301), the controller 51 controls the reset pulse generator 52 that generates the reset pulse to the ICG gate 43, so as to generate the ICG pulse, the ST pulse and the SH pulse at the timings in FIG. 1A, and set the integration period of the integration unit 42 to $T_1$ (step S302). At the same time, the timing signal IRCLK in FIG. 1A is generated, to set the ON duty ratio of the IRED to turn ON and OFF in the same periods (step S303).

Next, the first ring transfer is performed in the ring CCD 47 after the reset (step S304), and the second ring transfer is performed (step S305). Then it is determined whether or not the output voltage from the voltage buffer circuit 49 upon completion of the second ring transfer is higher than the skim judgment voltage (whether or not the output potential is lower than the skim judgment potential) (step S306).

If the output voltage is higher than the skim judgment voltage, the controller 51 controls the reset pulse generator 52, to generate the ICG pulse, the ST pulse and the SH pulse at the timings in FIG. 1B, to set the integration period of the integration unit 42 to $T_{1/2}$ (step S307). At the same time, the signal IRCLK is generated at the timing in FIG. 1B, to shorten the ON period of the IRED within a range where the IRED is ON during at least the above integration period $T_{1/2}$ (step S308), and the storing operation in the ring CCD 47 is continuously performed (step S309).

Further, if the output voltage is lower than the skim judgment voltage, the controller 51 does not change the timings of the signals IRCLK, the ICG pulse, the ST pulse and the SH pulse, and continuously performs the storing operation in the ring CCD 47 (step S309).

As described above, in the first embodiment, the ICG control is performed so as to prevent saturation of output potential. When the integration period of the integration unit 42 is reduced in half, the IRED is prevented as much as possible from being turned ON in a period in which charge is not actually integrated, and the ON period of the IRED is shortened within the range where the IRED is ON during at least a period in which charge is integrated. Thus, wasteful electric consumption is reduced. Especially, if the distance measuring apparatus is used as an AF apparatus of a camera, the battery drain in the camera can be reduced, further, the IRED has good durability.

Next, the distance measuring apparatus according to the second embodiment will be described. The construction of the distance measuring apparatus is the same as that in FIG. 2.

The operation of the distance measuring apparatus according to the second embodiment will be described with reference to FIG. 4. The signals IRCLK, ICG pulse, ST pulse and SH pulse have the same functions as those explained in FIGS. 10A and 10B.

FIG. 4A is a timing chart in a case where the integration period of the integration unit 42 is the maximum. In this case, the timings of the signals IRCLK, ICG pulse, ST pulse and SH pulse are the same as those in FIG. 10A.

FIG. 4B is a timing chart in a case where the integration period of the integration unit 42 is the half of that in FIG. 4A. In this case, the timings of the ICG reset pulse, the ST pulse and the SH pulse other than the signal IRCLK are the same as those in FIG. 1B. Further, the timing of the signal IRCLK is the same as that in FIG. 1B, however, an IRED drive current has a value ($I=I_2$) greater than that ($I=I_1$) in FIG. 4A.

Next, the operation of the distance measuring apparatus according to the second embodiment will be described in accordance with the flowchart of FIG. 5.

First, when the start signal START is applied to the controller 51 (step S701), the controller 51 controls the reset pulse generator 52 that generates the reset pulse to the ICG gate 43, to generate the ICG pulse, the ST pulse and the SH pulse at the timings in FIG. 4A, and set the integration period of the integration unit 42 to $T_1$ (step S702). At the same time, the signal IRCLK is generated at the timing in FIG. 4A, to set the IRED ON duty ratio to obtain the same ON and OFF periods (step S703). Next, the IRED drive current is set to the initial value $I_1$ (step S704).

Next, the first ring transfer is performed in the ring CCD 47 after reset (step S705), and the second ring transfer is performed (step S706). Then, it is determined whether or not the output voltage from the voltage buffer circuit 49 upon completion of the second ring transfer is higher than the skim judgment voltage (whether or not the output potential is lower than the skim judgment potential) (step S707).

If the output voltage is higher than the skim judgment voltage, the controller 51 controls the reset pulse generator 52, to generate the ICG pulse, the ST pulse and the SH pulse at the timings in FIG. 4B, to set the integration period of the integration unit 42 to $T_{1/2}$ (step S708), and at the same time, generates the signal IRCLK at the timing in FIG. 4B, to shorten the ON period of the IRED within the range where the IRED is ON during at least the above-described integration period $T_{1/2}$ (step S709), sets the IRED drive current to I2 ($>I_1$) (step S710), and continuously performs the storing operation in the ring CCD 47 (step S711).

If the output voltage is lower than the skim judgment voltage, the controller 51 does not change the timings of the signals IRCLK, the ICG pulse, the ST pulse and the SH pulse, and continuously performs the storing operation in the ring CCD 47 (step S711).

As described above, according to the second embodiment, the ICG control is performed to prevent saturation of output potential. If the integration period in the integration unit 42 is reduced in half, the amount of signal charge corresponding to the reflected light component from the distance measuring object, from the IRED light, becomes ½, however, the reduction of the amount of signal charge used in distance measurement calculation can be suppressed by increasing the IRED drive current.

Further, when the integration period is reduced in half by the ICG control, the ON period of the IRED is shortened at the same time. This reduces the IRED ON duty ratio, accordingly, further advantageously, increases the amount of current.

Note that in the distance measuring apparatus according to the above first and second embodiments, the two photo-reception systems are constructed with two sensor devices, and the distance is obtained by the correlation between two received light images. However, the distance may be obtained from the position of the center of gravity of a received light image on one sensor device, by utilizing the principle of triangulation.

As described above, according to the present invention, in the distance measuring apparatus which projects a spot pulse on a distance measurement object, receives reflected light from the object, and performs triangulation as distance measurement, stored charge is circulated and integrated in a ring portion comprising a CCD or the like having at least a ring-shaped part, further, skimming operation is performed to eliminate a predetermined amount of charge of extraneous light component other than the spot light component. Further, the distance measuring apparatus comprises gate means for controlling the amount of signal charge from the respective sensor pixels to avoid saturation of output potential, and an electronic shutter function (ICG) performed upon reset pulse or the like. As the ON duty ratio of light projection means is changed in correspondence with the set ICG status, to change the ON period of the light projection means, the IRED is turned OFF when charge storing is not performed. Thus, wasteful electric consumption can be reduced.

Further, as the ON duty ratio of the light projection means and current value are changed in correspondence with the set ICG status, even if the storing period is reduced by the ICG, the reduction of amount of stored signal charge can be suppressed by increasing the current in the light projection means.

The present invention is not limited to the above embodiments and various changes and modifications can be made within the spirit and scope of the present invention. Therefore, to appraise the public of the scope of the present invention, the following claims are made.

What is claimed is:

1. A distance measuring apparatus which projects spot light on a measurement object, receives reflected light from the object, and performs triangulation as distance measurement, comprising:

light projection means for projecting pulse light on said measurement object;

a sensor array having an array of a plurality of sensors to receive the reflected light from said measurement object and perform photoelectric conversion on the received reflected light;

integration means for integrating charge outputted from the respective sensors of said sensor array;

gate means for eliminating the charge from said integration means;

reset pulse generation means for supplying a reset pulse to said gate means;

charge transfer means, having a ring portion with at least a ring-shaped part to sequentially circulate and store the charge, for transferring the charge integrated by said integration means;

skimming means for eliminating a predetermined amount of charge from the charge transferred by said ring portion;

control means for operating said skimming means when a potential of the ring portion is equal to or lower than a predetermined judgment potential, and controlling timing of the reset pulse generated by said reset pulse generation means so as to shorten a charge storing period of said integration means when the potential of the ring portion after a plurality of charge storing operations is equal to or lower than said judgment potential; and change means for changing an ON period of said light projection means in correspondence with said charge storing period controlled by said control means.

2. The distance measuring apparatus according to claim 1, wherein if said charge storing period is shortened by said control means, the ON period of said light projection means is shortened within a range where said light projection means is ON during at least said charge storing period of said integration means.

3. The distance measuring apparatus according to claim 1, wherein said control means changes a drive current of said light projection means in correspondence with the ON period of said light projection means.

4. The distance measuring apparatus according to claim 3, wherein the shorter the ON period of said light projection means is, the greater the drive current of said light projection means is.

5. A computer readable storage medium containing a program for performing:

a light projection procedure for projecting pulse light on a measurement object;

a photoreception procedure for receiving reflected light from said measurement object by a sensor array having an array of a plurality of photoelectric conversion sensors;

an integration procedure for integrating charge outputted from the respective sensors of said sensor array;

a gate procedure for eliminating the charge from the integrated charge;

a reset procedure for resetting said gate procedure with a reset pulse;

a charge transfer procedure for transferring the integrated charge, using charge transfer means having a ring portion with at least a ring-shaped part to sequentially circulate and store the charge;

a skimming procedure for eliminating a predetermined amount of charge from the charge transferred by the ring portion;

a control procedure for performing said skimming procedure when a potential of the ring portion is equal to or lower than a predetermined judgment potential, and controlling timing of the reset pulse so as to shorten a charge storing period in said integration procedure when the potential of the ring portion after a plurality of charge storing operations is equal to or lower than said judgment potential; and a change procedure for changing an ON period of light projection means used in said projection procedure, in correspondence with the controlled charge storing period.

6. The computer readable storage medium according to claim 5, wherein if the charge storing period is shortened in said control procedure, the ON period of said light projection means is shortened within a range where said light projection means is ON during at least said charge storing period of said integration means.

7. The computer readable storage medium according to claim 5, wherein the program further performs a procedure for changing a drive current of said light projection means in correspondence with the ON period of said light projection means.

8. The computer readable storage medium according to claim 7, wherein the shorter the ON period of said light projection means is, the greater the drive current of said light projection means is.

* * * * *